(12) United States Patent
Tschudin

(10) Patent No.: US 11,092,469 B2
(45) Date of Patent: Aug. 17, 2021

(54) MAGNETICALLY INDUCTIVE FLOW METER

(71) Applicant: Endress+Hauser Flowtec AG, Reinach (CH)

(72) Inventor: Beat Tschudin, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 101 days.

(21) Appl. No.: 16/628,801

(22) PCT Filed: Jun. 19, 2018

(86) PCT No.: PCT/EP2018/066258
§ 371 (c)(1),
(2) Date: Jan. 6, 2020

(87) PCT Pub. No.: WO2019/007672
PCT Pub. Date: Jan. 10, 2019

(65) Prior Publication Data
US 2020/0200575 A1  Jun. 25, 2020

(30) Foreign Application Priority Data

Jul. 6, 2017  (DE) .................... 10 2017 115 155.9

(51) Int. Cl.
*G01F 1/58* (2006.01)
*G01F 15/18* (2006.01)

(52) U.S. Cl.
CPC .............. *G01F 1/586* (2013.01); *G01F 1/584* (2013.01); *G01F 1/588* (2013.01); *G01F 15/18* (2013.01)

(58) Field of Classification Search
CPC .......... G01F 1/586; G01F 1/584; G01F 1/588; G01F 15/18
See application file for complete search history.

(56) References Cited

U.S. PATENT DOCUMENTS

| | | | |
|---|---|---|---|
| 2014/0251025 A1 | 9/2014 | Rogers et al. | |
| 2015/0316399 A1* | 11/2015 | Graf | ........................ G01F 1/588 |
| | | | 73/861.12 |

FOREIGN PATENT DOCUMENTS

| | | |
|---|---|---|
| CN | 201964914 U | 9/2011 |
| CN | 203396439 U | 1/2014 |
| CN | 105580094 A | 5/2016 |
| DE | 19958285 A1 | 6/2001 |

(Continued)

*Primary Examiner* — Herbert K Roberts
*Assistant Examiner* — John M Royston
(74) *Attorney, Agent, or Firm* — Christopher R. Powers; Endress+Hauser (USA) Holding Inc.

(57) ABSTRACT

The present disclosure relates to a magnetically inductive flow measuring device comprising: a measuring tube; a magnet system having a coil system, wherein the magnet system has a coil holder that holds the coil system; a pair of measuring electrodes; a field guide-back that passes around the measuring tube and comprises a first part and an equal second part each with a first planar end, a second planar end and a central region, wherein the first part and second part are adapted to be brought together via their ends, wherein each of the first ends and the second ends has an engagement opening and an engagement means, wherein the engagement means of each end is adapted upon bringing together of the equal parts to engage in an engagement opening of an end of the other equal part.

15 Claims, 5 Drawing Sheets

(56) References Cited

FOREIGN PATENT DOCUMENTS

| | | |
|---|---|---|
| DE | 102011079352 A1 | 1/2013 |
| DE | 102014106567 A1 | 11/2015 |
| EP | 1592950 B1 | 6/2016 |
| JP | 08261807 A | 10/1996 |
| JP | H08261807 A | 10/1996 |
| RU | 2599766 C2 | 10/2016 |

* cited by examiner

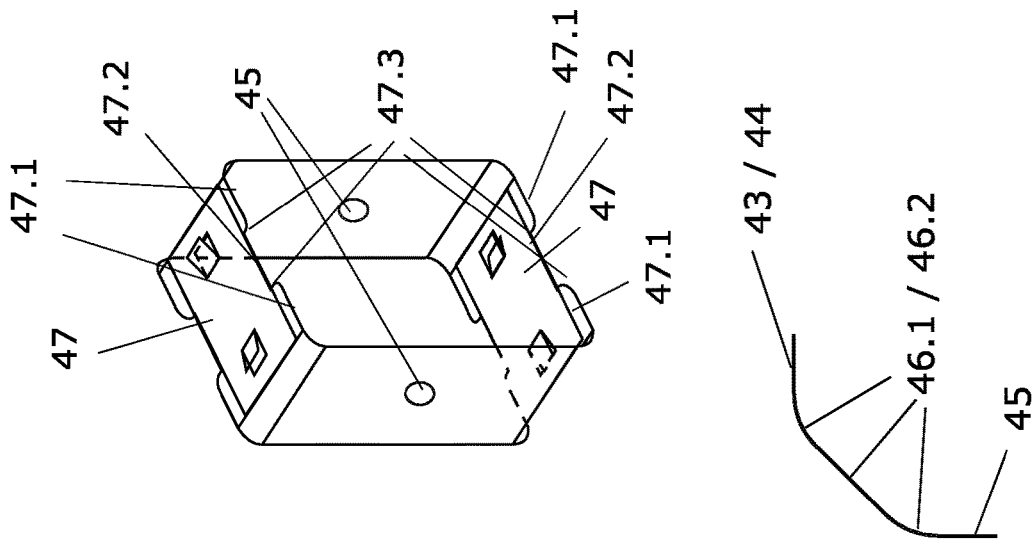
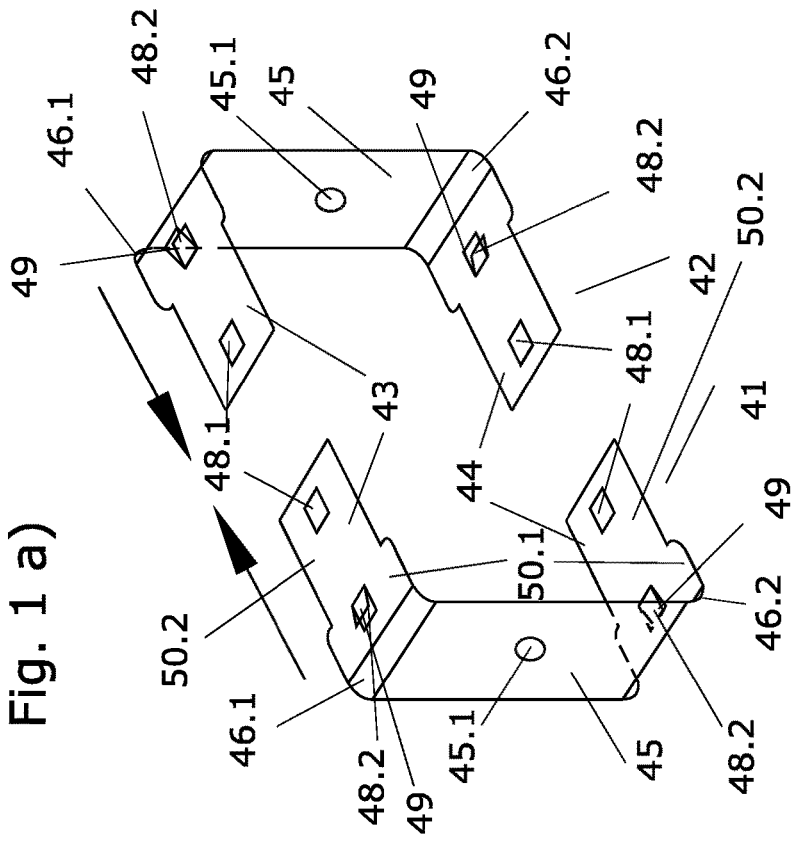

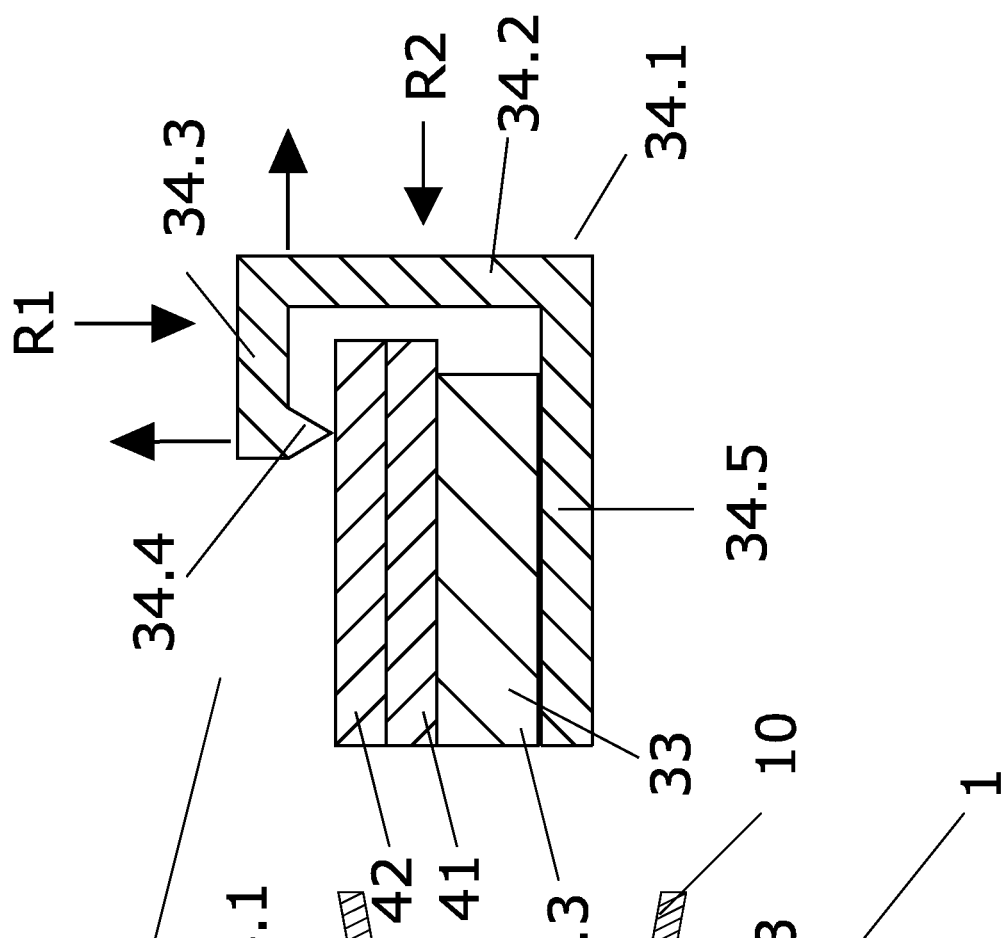

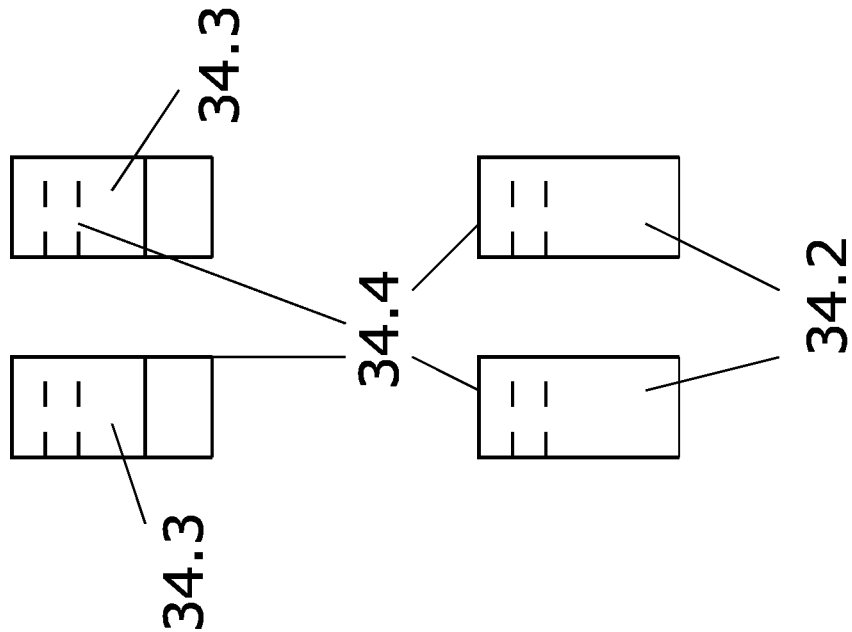

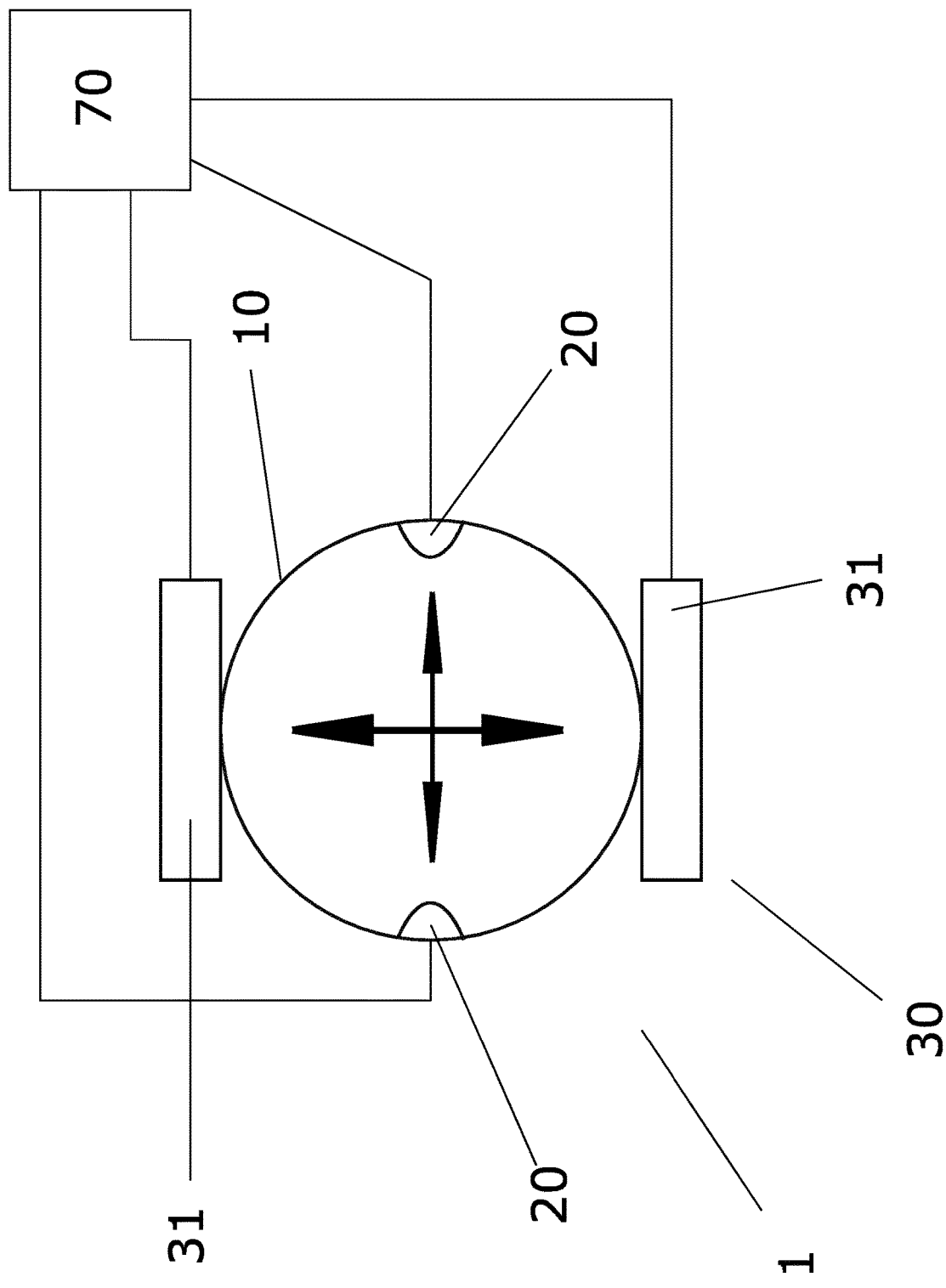

MAGNETICALLY INDUCTIVE FLOW METER

CROSS-REFERENCE TO RELATED APPLICATIONS

The present application is related to and claims the priority benefit of German Patent Application No. 10 2017 115 155.9, filed on Jul. 6, 2017, and International Patent Application No. PCT/EP2018/066258 filed on Jun. 19, 2018, the entire contents of which are incorporated herein by reference.

TECHNICAL FIELD

The invention relates to a magnetically inductive flow measuring device for measuring flow velocity, or volume flow, of a medium flowing through a measuring tube.

BACKGROUND

Typical magnetically inductive flow measuring devices have a measuring tube to convey a medium, a magnet system for producing a magnetic field, which extends perpendicularly to the measuring tube, and a pair of measuring electrodes for registering a flow-dependent, electrical voltage induced in the medium by the magnetic field. In order to lead the magnetic field away from the measuring tube and in order to prevent uncontrolled excursions of the magnetic field, frequently a metal field guide-back is applied, which concentrates the field lines into a defined spatial region. Such are frequently embodied in the form of two metal sheets, which are mechanically contacted in the manufacturing, such as, for example, shown in DE102014106567A1.

For stable operation of a flow measuring device, it is especially important that such mechanical contacting be stable, in order that the field conduction properties are constant. A change of the field conduction properties leads to a changed magnetic field in the measuring tube and, thus, to changed voltage values, this resulting in an unstable flow measurement. DE102014106567A1 gives no indication how this mechanical contacting can be made stable.

SUMMARY

An object of the invention is, consequently, to provide a magnetically inductive flow measuring device, which has stable magnetic properties and which has an as simple as possible field guide-back, especially one capable of assembly without some supplemental assist, such as e.g., adhesive or welding or screws.

A magnetically inductive flow measuring device of the invention for measuring flow velocity, or volume flow, of a medium flowing through a measuring tube comprises:
 a measuring tube having a conveying lumen to convey a medium, wherein the measuring tube has a measuring tube axis;
 a magnet system with a first coil system with a first coil and with a first coil core, and with a second coil core, wherein the coil cores are arranged on opposite measuring tube sides, and wherein the magnet system is adapted to produce a magnetic field extending perpendicularly to the measuring tube axis, wherein the magnet system has at least one coil holder, by means of which at least one coil system is held;
 a pair of measuring electrodes for registering a flow-dependent electrical voltage induced in the medium by the magnetic field;
 an electronic measuring/operating circuit for operating the magnet system as well as the electrodes and for providing a measured variable representing the flow;
 wherein the magnetically inductive flow measuring device has a field guide-back adapted to lead the magnetic field between the coil systems and away from the measuring tube;
 wherein the coil core is adapted to lead the magnetic field between the measuring tube and the field guide-back, wherein the coil core has on a measuring tube far end an outer pole shoe, against which the field guide-back lies,
 wherein the field guide-back passes around the measuring tube,
 wherein the field guide-back comprises:
 a first building block part and a second building block part of equal construction with, in each case, a first planar end, a second planar end and a central region;
 wherein the equal building block parts are manufactured of sheet metal, wherein the first ends are separated from the central regions by first bending sections, and wherein the second ends are separated from the central regions by second bending sections,
 wherein the first end and the second end of a building block part extend in parallel with one another,
 wherein the first building block part and the second building block part are adapted to be brought together via their ends, wherein the field guide-back has two overlapping regions, in which ends of the equal building block parts overlap,
 wherein the first ends and the second ends have, in each case, at least one engagement opening and at least one engagement means,
 wherein the engagement means of each end is adapted upon bringing together of the equal building block parts to engage in an engagement opening of an end of the other equal building block part.

The equal building block parts are, in such case, preferably manufactured of electro sheet. The equal building block parts are, in such case, manufactured, for example, by sheet stamping, laser cutting or water jet cutting and subsequent sheet bending.

In an embodiment, the magnetically inductive flow measuring device includes a second coil, which forms with the second coil core a second coil system.

In an embodiment, the engagement means is a fin, which engages in the engagement opening, wherein the fin is formed from the building block part, wherein the forming process is selected from the following list: punching, stamping, cutting, laser cutting, sawing, etching.

The fin extends from an end, and is formed, for example, by bending. The building block part properties arise, in such case, from stamped parts. The orientation of the fin after bending from the end is not an equal building block part property.

In an embodiment, the central region includes a window, which is adapted to accommodate a measuring electrode or a measuring electrode contacting of a magnetically inductive flow measuring device.

In an embodiment, the central region is planar.

In an embodiment, the field guide-back has a cross sectional area, relative to which the equal building block parts are symmetrical, wherein the equal building block parts as well as the field guide-back have a width extending perpendicularly to the cross sectional area,
wherein the ends have a first region and a second region, wherein the first region adjoins the first bending section, or the second bending section, and wherein the second region adjoins the first region,
wherein the first region has a first width, and wherein the second region has a second width, wherein the first width is greater than the second width, and
wherein the overlapping regions of the field guide-back have, in each case, two outer regions and, in each case, a central region, wherein the outer regions are, in each case, facing a central region, and wherein the central region is arranged between the outer regions,
wherein the outer regions have a third width and the central regions a fourth width, wherein the third width equals the first width, and wherein the fourth width equals the second width, wherein a transition from an outer region to a central region is a stop.

A bending section can have a bend, which bend follows, for example, at least sectionally, a circumference. A bending section can also have two or more bends, which are connected by a straight section.

In an embodiment, the coil holder includes on at least one side far from the measuring tube at least one pressing mechanism, which is adapted to press the field guide-back against the outer pole shoe of a coil core.

In an embodiment, the pressing mechanism includes at least one projection in parallel with a coil core axis, which projection protrudes from a coil holder base body beside the field guide-back and beyond the field guide-back, and wherein the pressing mechanism has at least one cantilever, which is connected with at least one projection and at least partially wraps around an edge region of the field guide-back, wherein a wrapping around region of the cantilever has on a field guide-back facing side at least one squeeze rib, which is adapted to press the field guide-back against the pole shoe.

In an embodiment, the squeeze rib is adapted to deform upon pressing the field guide-back.

In an embodiment, the squeeze rib extends in parallel with the field guide-back, wherein the squeeze rib has a cross section of triangular form, wherein a corner of the cross section pointing toward the field guide-back has an angle of less than 90° and especially less than 80°, preferably less than 70°. Smaller angles increase the deformability of the squeeze rib.

In an embodiment, the squeeze rib extends in parallel with the field guide-back, wherein the squeeze rib has a cross section of a circular section, wherein a side of a circle belonging to the circular section and corresponding to the circumference is directed toward the field guide-back.

In an embodiment, the at least one projection is adapted in the case of pressing to absorb a pressing force defined by the at least one cantilever, and the at least one projection via the at least one cantilever, and to deform.

In an embodiment, the pressing mechanism engages a central region of the field guide-back, whereby the field guide-back is positioned by means of the stops.

In an embodiment, the coil holder is manufactured by means of an injection molding method. Especially, the coil holder is manufactured by means of a thermoplastic or thermoplastic injection molding method.

BRIEF DESCRIPTION OF THE DRAWINGS

The invention will now be explained based on examples of embodiments presented in the appended drawing, the figures of which show as follows:

FIGS. 1a and 1b show schematically by way of example, equal building block parts of a field guide-back of a flow measuring device of the present disclosure and their joining to form a field guide-back;

FIG. 1c shows various embodiments of bending sections of a building block part;

FIG. 3a shows a schematic longitudinal section of an example of a flow measuring device of the present disclosure;

FIG. 3b shows a detail enlargement of FIG. 3a;

FIGS. 4a-4c show schematic views of pressing mechanisms; and

FIG. 5 shows schematically, the operation of a typical magnetically inductive flow measuring device.

DETAILED DESCRIPTION

Figure 2:
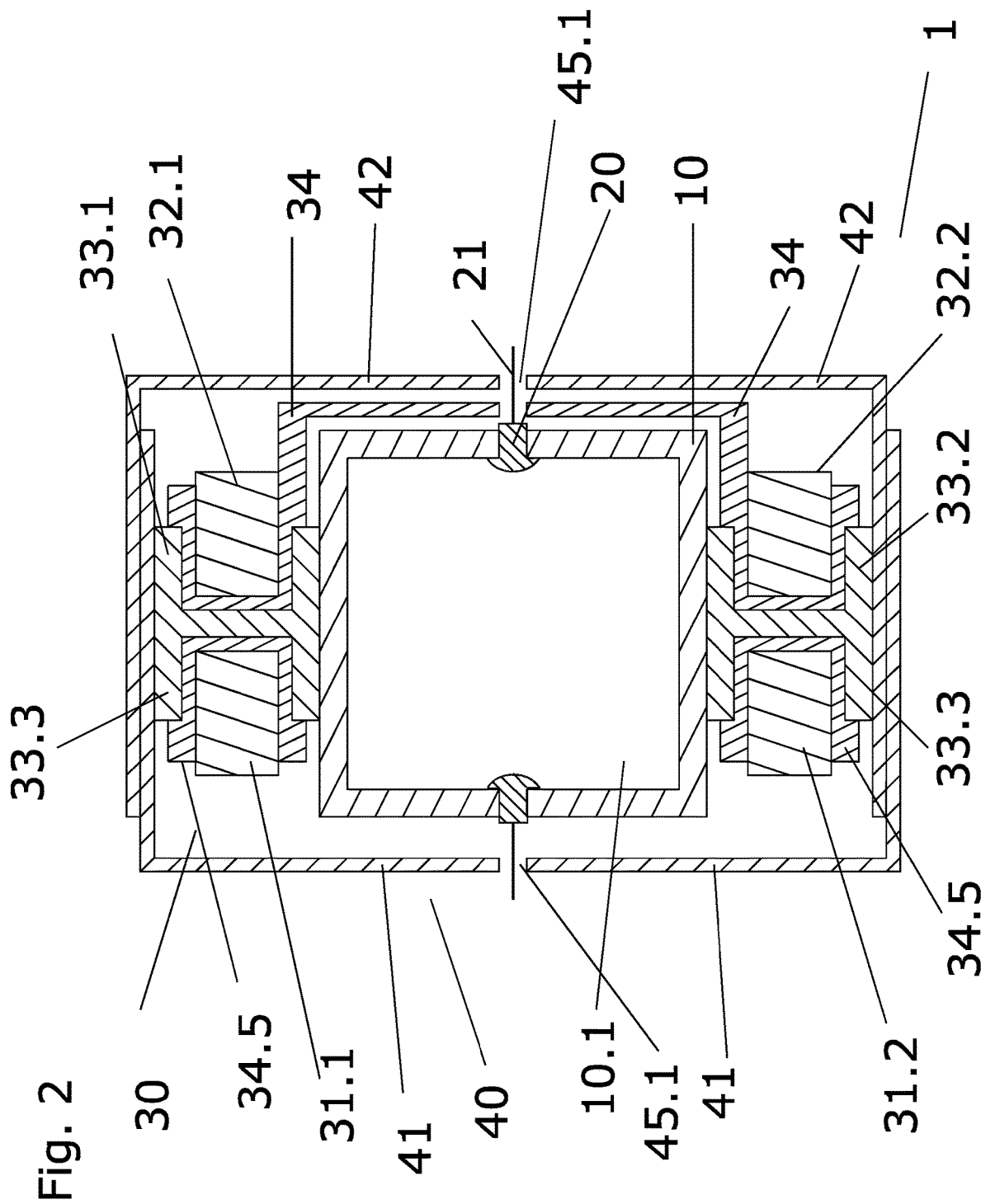
FIG. 2 shows a schematic cross section of an example of a flow measuring device of the present disclosure.

FIG. 1 a) shows a pair of equal building block parts of a field guide-back 40 of a magnetically inductive flow measuring device 1 of the invention with a first building block part 41 and a second building block part 42. The first and second building block parts are of equal construction. FIG. 1 b) shows a field guide-back 40 manufactured by assembling the two equal building block parts. Each building block part 41, 42 includes a first planar end 43 as well as a second planar end 44 and a central region 45, which central region, such as here, is, for example, planar. The first planar end of a building block part is connected with the central region via a first bending section 46.1, and the second planar end of a building block part is connected with the central region 45 via a second bending section 46.2, wherein the first planar end 43 and the second planar end 44 are oriented in parallel with one another and relative to the corresponding central region both extend on the same side. The two planar ends 43, 44 of a building block part have each an engagement opening 48.1 as well as an engagement means 48.2. The engagement means 48.2, such as here, can be, for example, a fin 49, which is bent out from the end. The orientation of a fin after bending out of its end is not taken into consideration in determining the equality of the construction of the building block parts. The fin can, such as here, be embodied flat, for example. Alternatively, the fin can also have a curved profile. In the case of bringing the equal building block parts together, at least one engagement means 48.2 of the one building block part engages in an engagement opening 48.1 of the other building block part, wherein two overlapping regions 47 form. The central region 45 of each building block part includes a window 45.1 for a measuring electrode, or a contacting of a measuring electrode. The equal building block parts are manufactured in especially easy and cost effective manner by sheet stamping and subsequent sheet bending, wherein the resulting stamped and bent building block parts are of equal construction. The first planar end 43 as well as the second planar end 44 of a building block part 41, 42 have, in each case, a first region 50.1 following on the first bending section 46.1, or the second bending section 46.2, and a first width, and, in each case, a second region 50.2 following on the first region 50.1 and a second width, wherein the first width is greater than the second width. This has the result that an overlap region 47 is, in each case, divided into two outer regions 47.1 with the first width and, in each case, a central region with the second width, wherein transitions from outer regions to the central regions represents, in each case, a stop 47.3.

FIG. 1 c) shows two embodiments of a first bending section 46.1, or second bending section 46.2, for connecting the central region 45 with the first planar end 43 and the second planar end 44. For example, the planar ends can be connected by one bend section, which has one bend, which bend follows, for example at least sectionally, a circumference. A bending section can also have two or more bends, which are connected by one or more straight sections.

FIG. 2 shows a schematic cross section of a magnetically inductive flow measuring device 1 of the invention with a measuring tube 10, into which two measuring electrodes 20 extend. A conveying lumen 10.1 of the measuring tube to convey a medium can, such as here, have a rectangular shape in a cross section of the measuring tube containing the measuring electrodes 20. Alternatively, also round or oval embodiments are possible. The magnetically inductive flow measuring device includes, furthermore, a magnet system 30 with a first coil system 31.1 and a second coil system 31.2, wherein the first coil system has a first coil 32.1 with a first coil core 33.1, and wherein the second coil system has a second coil 32.2 with a second coil core 33.2, wherein the coil cores have, in each case, a measuring tube far, outer pole shoe 33.3. The coil cores can, for example, such as shown in this example of an embodiment, be integrated in a coil holder 34 of the magnetically inductive flow measuring device, which coil holder is manufactured, for example, by means of an injection molding method and is ideally embodied as one piece. The coil cores are on a side facing the measuring tube 10 ideally fitted to an outer contour of the measuring tube. The magnetically inductive flow measuring device includes a field guide-back 40 of FIGS. 1 a) to 1 c) with a first and second building block parts 41, 42 of equal construction, wherein the field guide-back passes around the measuring tube 10. Bending sections 46.1, 46.2 of FIGS. 1 a) to 1 c) are for reasons of clarity not shown. The equal building block parts have, in each case, a window 45.1, through which a measuring electrode contacting 21 extends, which is adapted to connect the measuring electrodes with an electronic measuring/operating circuit 70 of FIG. 5. The coil holder can on its part also have an opening for accommodating a measuring electrode, or a measuring electrode contacting. The equal building block parts overlap, in such case, in the regions of the outer pole shoes 33.3 and engage with one another by means of the engagement means and engagement openings shown in FIG. 1, wherein the field guide-back 40 lies against the outer pole shoes 33.1, which extend out from a coil holder base body 34.5.

FIG. 3 a) shows a schematic longitudinal section through the magnetically inductive flow measuring device 1 of the invention shown in FIG. 2 with measuring tube 10, magnet system comprising two coil systems with, in each case, a coil 32.1, 32.2 and, in each case, a coil core contained in the coil holder 34. The field guide-back 40 with the first building block part 41 and the second building block part 42 lies, in such case, against the outer pole shoes 33.3 of the coil cores. In order to improve and lastingly to maintain stable a transition of a magnetic field produced by the coils 32.1, 32.2 between coil core and field guide-back as well as between the equal building block parts of the field guide-back in the overlap region 47, the coil holder 43 includes pressing mechanisms 34.1, which are adapted to press the field guide-back 40 in defined manner with elastic prestress against the outer pole shoes 33.1 of the coil cores 33. The measuring tube can such as shown here have a smallest diameter in a central region. The measuring tube can, however, also have a constant diameter along its longitudinal axis.

The detail enlargement of the pressing mechanism 34.1 shown in FIG. 3 b) shows a projection 34.2 of the pressing mechanism, which protrudes from a coil holder base body 34.5 beside the equal building block parts 41, 42 of the field guide-back and extends past the equal building block parts 41, 42 of the field guide-back as well as past the outer pole shoe. A cantilever 34.3 of the pressing mechanism follows on the projection and wraps partially around the equal building block parts as well as the outer pole shoe 33.3, wherein the cantilever has a squeeze rib 34.4, whose cross section has a triangular shape. Alternatively, the cross section of the squeeze rib can also have a circular segment form. Before assembly of the field guide-back, the squeeze rib has a separation from the outer pole shoe 33.3, which is less than a thickness of the field guide-back in parallel with a coil axis. Upon assembly of the field guide-back by bringing the equal building block parts 41, 42 together, there is exerted via the squeeze rib on the pressing mechanism a force, which leads to a deformation of the squeeze rib. The force exerted on the pressing mechanism causes, furthermore, a deflection of the cantilever 34.3 as well as of the projection 34.2 such as indicated by the arrows pointing away from the pressing mechanism, this leading to the exertion of a bending moment on the coil holder base body 34.5. In the case of a squeeze rib more yielding in comparison with the cantilever and with the projection, the pressing force stabilizes long term. Furthermore, it can thereby be achieved that different magnetically inductive flow measuring devices of a batch do not vary much at all from one another. A pressing mechanism, in such case, engages an overlap region 47, this meaning, thus, that any movement of the field guide-back 40 is limited by the stops 47.3. In the case of an accurately fitting embodiment of the pressing mechanism with the field guide-back, a durable positioning of the field guide-back can be achieved.

FIGS. 4 a) to c) show, schematically, different forms of embodiment of pressing mechanisms of a flow measuring device of the invention as viewed from two different directions designated R1 and R2 in FIG. 3 b).

FIG. 4 a) shows a pressing mechanism with two projections 34.2, each with a cantilever 34.3 holding between them a squeeze rib. FIG. 4 b) shows a pressing mechanism with a single projection 34.2 with a single cantilever 34.3 holding a squeeze rib. FIG. 4 c) shows a pressing mechanism with two projections, each with a cantilever, and each cantilever has a squeeze rib. By varying the number n1 of the projections, the number n2 of the cantilevers, the number n3 of the squeeze ribs, as well as their expansions along the field guide-back, an area moment of inertia of the pressing mechanism can be set and, thus, the pressing force of the pressing mechanism. The numbers n1, n2 and n3 are preferably 1 or 2. They can, however, also assume greater values.

FIG. 5 shows the operation of a magnetically inductive flow measuring device 1 of the invention based on a simplified illustration. Included are the measuring tube 10, measuring electrodes 20 arranged in the measuring tube, the magnet system 30 with two coil systems 31, as well as an electronic measuring/operating circuit. The magnet system is adapted to produce a magnetic field extending perpendicularly to a measuring tube axis; see vertical double arrow. The magnetic field induces in a medium flowing in the measuring tube a flow-dependent electrical voltage (see horizontal double arrow), which is registered by the measuring electrodes and led to the electronic measuring/operating circuit 70. The electronic measuring/operating circuit is adapted to provide a flow-dependent measured variable based on the electrical voltage and to operate the magnet system.

The invention claimed is:

1. A magnetically inductive flow measuring device for measuring flow velocity or volume flow of a medium flowing through a measuring tube, the device comprising:
   a measuring tube including a conveying lumen adapted to convey a medium, wherein the measuring tube has a measuring tube axis;
   a magnet system including a first coil system, with a first coil and a first coil core, and a field conduction body, wherein the first coil core and the field conduction body are disposed on opposite sides of the measuring tube, wherein the magnet system has at least one coil holder configured to hold at least one coil system, and wherein the magnet system is adapted to generate a magnetic field extending perpendicular to the measuring tube axis;
   a pair of measuring electrodes configured to register a flow-dependent electrical voltage induced in the medium by the magnetic field;
   an electronic measuring/operating circuit configured to operate the magnet system and the electrodes and to determine a measured variable representing the flow; and
   a field guide-back configured to direct the magnetic field away from the measuring tube between a measuring tube side opposite the coil system and a coil system side opposite the measuring tube;
   wherein the first coil core and the field conduction body are configured to direct the magnetic field between the measuring tube and the field guide-back, wherein the first coil core and the field conduction body each have on a side opposite the measuring tube an outer pole shoe against which the field guide-back lies,
   wherein the field guide-back extends around the measuring tube and comprises a first guide-back part and a second guide-back part of equal construction, each including a planar first end, a planar second end and a central region,
   wherein the first guide-back part and second guide-back parts are manufactured of sheet metal,
   wherein each first end is separated from the central region by a first bending section, and wherein each second end is separated from the central region by a second bending section,
   wherein the first end and the second end of each guide-back part extend in parallel with one another,
   wherein the first guide-back part and the second guide-back part are configured to be brought together via their respective first and second ends such that the field guide-back has two overlapping regions in which the respective first and second ends of the first and second guide-back parts, respectively, overlap,
   wherein the first ends and the second ends each have at least one engagement opening and at least one engagement feature, and
   wherein the at least one engagement feature of each end is configured, upon assembling the first guide-back part and second guide-back part together, to engage the at least one engagement opening of a corresponding end of another guide-back part.

2. The device of claim 1, the device further comprising a second coil, wherein the field conduction body is configured as a second coil core of the second coil, wherein the second coil and the second coil core comprise a second coil system, and wherein the first coil system and the second coil system are similarly embodied.

3. The device of claim 1, wherein the at least one engagement feature is a fin that engages in the at least one engagement opening, wherein the fin is formed from the guide-back part, and wherein the forming process includes punching, stamping, cutting, laser cutting, sawing, etching and/or water jet cutting.

4. The device of claim 1, wherein each central region includes a window adapted to accommodate a measuring electrode or a measuring electrode contacting of a magnetically inductive flow measuring device.

5. The device of claim 1, wherein each central region is planar.

6. The device of claim 1, wherein the field guide-back has a cross-sectional area, relative to which the first and second guide-back parts are symmetrical, wherein the field guide-back, and the first and second guide-back parts thereof, each have a width extending perpendicularly to the cross sectional area,
   wherein each of the first and second ends has a first region and a second region, wherein each first region adjoins the first bending section or the second bending section, and wherein each second region adjoins the corresponding first region,
   wherein each first region has a first width, and each second region has a second width, wherein the first width is greater than the second width,
   wherein the overlapping regions of the field guide-back each have two outer regions and a central region, wherein the outer regions are each facing a central region, and wherein the central region is arranged between the outer regions,
   wherein the outer regions have a third width and the central regions a fourth width, wherein the third width equals the first width, and the fourth width equals the second width, and
   wherein a transition from an outer region to a central region is a stop.

7. The device of claim 1, wherein the at least one coil holder includes on at least one side opposite from the measuring tube a pressing mechanism configured to press the field guide-back against the outer pole shoe of the first coil core and/or the field conduction body.

8. The device of claim 7, wherein the pressing mechanism includes a projection in parallel with a coil core axis, the projection protruding from a coil holder base body adjacent the field guide-back and beyond the field guide-back,
   wherein the pressing mechanism includes a cantilever connected to the projection and at least partially extending around an edge region of the field guide-back, and wherein the cantilever includes a squeeze rib configured to press the field guide-back against the outer pole shoe.

9. The device of claim 8, wherein the squeeze rib is configured to deform upon pressing onto the field guide-back.

10. The device of claim 8, wherein the squeeze rib extends in parallel with the field guide-back and has a triangular cross-section, and wherein a corner of the triangular cross-section pointing toward the field guide-back has an angle of less than 90°.

11. The device of claim 10, wherein the corner of the triangular cross-section pointing toward the field guide-back has an angle of less than 70°.

12. The device of claim 8, wherein the squeeze rib extends in parallel with the field guide-back, wherein the squeeze rib has a circular cross-section having a radius, and wherein an edge of the squeeze rib corresponding to the radius is directed toward the field guide-back.

13. The device of claim 8, wherein the projection and/or the cantilever are configured to absorb a pressing force, which is at least partially defined by the cantilever and the projection via the cantilever, and to deform.

14. The device of claim 7, wherein the pressing mechanism engages a central region of the field guide-back, whereby the field guide-back is positioned using stops.

15. The device of claim 1, wherein the at least one coil holder is manufactured using an injection molding method.

\* \* \* \* \*